(12) United States Patent
Cipolla et al.

(10) Patent No.: US 6,181,554 B1
(45) Date of Patent: Jan. 30, 2001

(54) PORTABLE COMPUTER RISER FOR ENHANCED COOLING

(75) Inventors: Thomas Mario Cipolla, Katonah; Claudius Feger, Hopewell Junction, both of NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/184,143

(22) Filed: Oct. 8, 1998

(51) Int. Cl.[7] .................................................. H05K 7/20
(52) U.S. Cl. ........................ 361/687; 361/683; 361/688; 361/690
(58) Field of Search .................................. 361/687, 688, 361/690, 694–697

(56) References Cited

U.S. PATENT DOCUMENTS 5,552,960 * 9/1996 Nelson et al. ........................ 361/687

OTHER PUBLICATIONS

A. Yu, "The Future of Microprocessors" IEEE Micro, Dec. 1996 pp. 46–53.

* cited by examiner

*Primary Examiner*—Leo P. Picard
*Assistant Examiner*—Yean-Hsi Chang
(74) *Attorney, Agent, or Firm*—Daniel P. Morris; Alvin J. Riddles

(57) ABSTRACT

Passive cooling of a portable personal computer is enhanced by providing a capability for raising one side of a computer with respect to another thus exposing the bottom surface of the computer base to the ambient air with the heat being dissipated providing an air flow over the bottom surface of the base portion of the computer. A mechanism is provided that is actuated by opening the cover that positions the base in a tilted position. An improved keyboard angle also results.

10 Claims, 4 Drawing Sheets

PORTABLE COMPUTER RISER FOR ENHANCED COOLING

FIELD OF INVENTION

The invention relates to the enhancement of the cooling capacity of a portable computer and in particular to the automatic deploying and manually retracting of a riser capability that provides increased thermal transfer through the base of the portable computer package together with an improved keyboard tilt position.

BACKGROUND OF THE INVENTION

Since their conception, portable computers, as with all computers, have faced the issue of thermal management as a result of heat generated by the processor and other components that are densely packed in the computer. As is well known, many components of computers are sensitive to excessive heat that can degrade performance and result in damage.

The packaging of the portable computer has evolved into the use of a case in which, in a base portion, a keyboard is positioned adjacent to the user and on which on a hinged cover, including a display, is positioned facing the user when the cover is open. The package or case is about the size of a notebook, weighs about 5 pounds, and covers a typical size of about a 297 by 210 millimeter(mm) area.

Within the base, as a result of the capacity and performance increases, thermal management is often an important consideration in the computer design. In the last few years, the thermal dissipation requirements of portable computers have been rapidly increasing. For example, typical portable personal computers generate heat that must be dissipated in the range of from about 10 watts to 20 watts and beyond, in part a result of increasing central processing unit (CPU) performance and for a further part by additional function capabilities such as digital video disk (DVD), modem, audio and video that are being added.

Among the thermal management constraints encountered in design are the fact that the components of the computer are generally localhized heat generating elements that are enclosed in a physically small space in that base portion and are operated at close temperature tolerances. The base portion in turn usually rests in contact with the user so that high temperatures generated in the base are immediately apparent to the user. Passive cooling methods are most desirable because no power is consumed, no noise is generated and very little additional space is required. The best that can be done at the present state of the art, even including providing additional passive cooling capacity through the use of heat pipe technology, is from about 15 to about 20 watts. One way to increase cooling capacity is to add an active cooling device such as a fan. This has not been considered desirable because such devices take up space, consume power and generate noise. Space and battery power are at a very high premium in portable computers, and noise is highly undesirable.

SUMMARY OF THE INVENTION

The invention achieves a substantial increase in the passive dissipation of heat produced in the base of a portable computer package by providing a riser capability that positions one portion of the base of the package higher than another which produces an air flow over the bottom of the base and a tilt to the keyboard. The air flow operates to improve and greatly increase the passive dissipation of the portable computer package in handling the heat produced by the components in the base thereby permitting an increase in the operating temperature range in the portable computer design. The tilt produced by the raising of one side of the package also provides an improved keyboard angle for the user. In the invention, a riser mechanism is provided, through which, in response to the opening of the cover, the side of the base that is away from the user, is raised above the side next to the user, thereby providing a tilt to the base which is supporting the keyboard and providing an air flow path in which the air warmed by the bottom of the base can flow and thereby substantially increase passive cooling. An additional benefit is that the user is insulated from the possibly hot base.

BRIEF DESCRIPTION OF THE DRAWINGS:

FIGS. 2 through 7 are overall isometric and side views of an embodiment of a mechanism that actuates the riser capability when the cover of the portable computer package is opened, wherein:

FIG. 2 is an overall isometric view of a portable computer with the components removed from the base;

FIG. 3 is a side cutaway view of the portable computer in the closed position;

FIG. 4 is an expanded scale portion of FIG. 3 illustrating the riser force and limiting elements;

FIG. 5 is a side cutaway view of the portable computer as shown in FIG. 3 with the riser capability mechanism in the extended position;

FIG. 6 is an independent view of the bottom portion of the riser capability mechanism, and;

FIG. 7 is a side cutaway view of the portable computer as shown in FIG. 5 with the cover open.

DESCRIPTION OF THE INVENTION

In accordance with the invention, a capability is provided that when the portable computer is operational raises the side of the portable computer that is away from the user so as to provide an upwardly slanting airflow pathway over all of the lower surface of the base portion of the portable computer package. This permits the ambient air to contact and flow over the full lower surface of the base which in turn increases dissipation of heat. The upward slant operates to impart a convective motion to the flow of the ambient air as it passes over the bottom of the base, insulates the user from the possibly hot base and also provides an improved keyboard angle for the user. In the operation of a portable computer with a tilt, in accordance with the invention, so the back of the computer is raised upward approximately 30 millimeters above the front, there will be an increase in heat dissipation that is approximately three watts for an example area of about 297 by 210 millimeters square at a surface temperature of 50 degrees C. In addition by allowing the temperature of the bottom surface of the base portion of the computer package to increase, for example, from 50 degrees C. to 60 degrees C. will operate to permit dissipation of approximately another three watts. Thus, this invention, that provides for both; raising the back of the computer at least 30 millimeters thereby imparting a convective component to the air flow and relaxing a constraint on the operating temperature of the heat generating components in the base by permitting the temperature of the bottom surface of the base portion of the portable computer package to increase to at least 60 degrees C, will allow at least six additional watts of power to be dissipated without the addition of any active cooling device. Portable personal computers today are passively dissipating around 10 watts. In accordance with this invention additional passive cooling capacity of at least 60 per cent is provided. The invention will allow greater heights than 30 millimeters and greater temperatures than 60 degrees C.,thus greater heat dissipation capacity. The magnitude of these numbers are largely limited by user acceptance.

The invention in tilting the base supporting the keyboard also provides improved ergonomic conditions in relaxing the bending of the wrist of the user at the keyboard and thus providing a more comfortable typing position.

Figure 1:
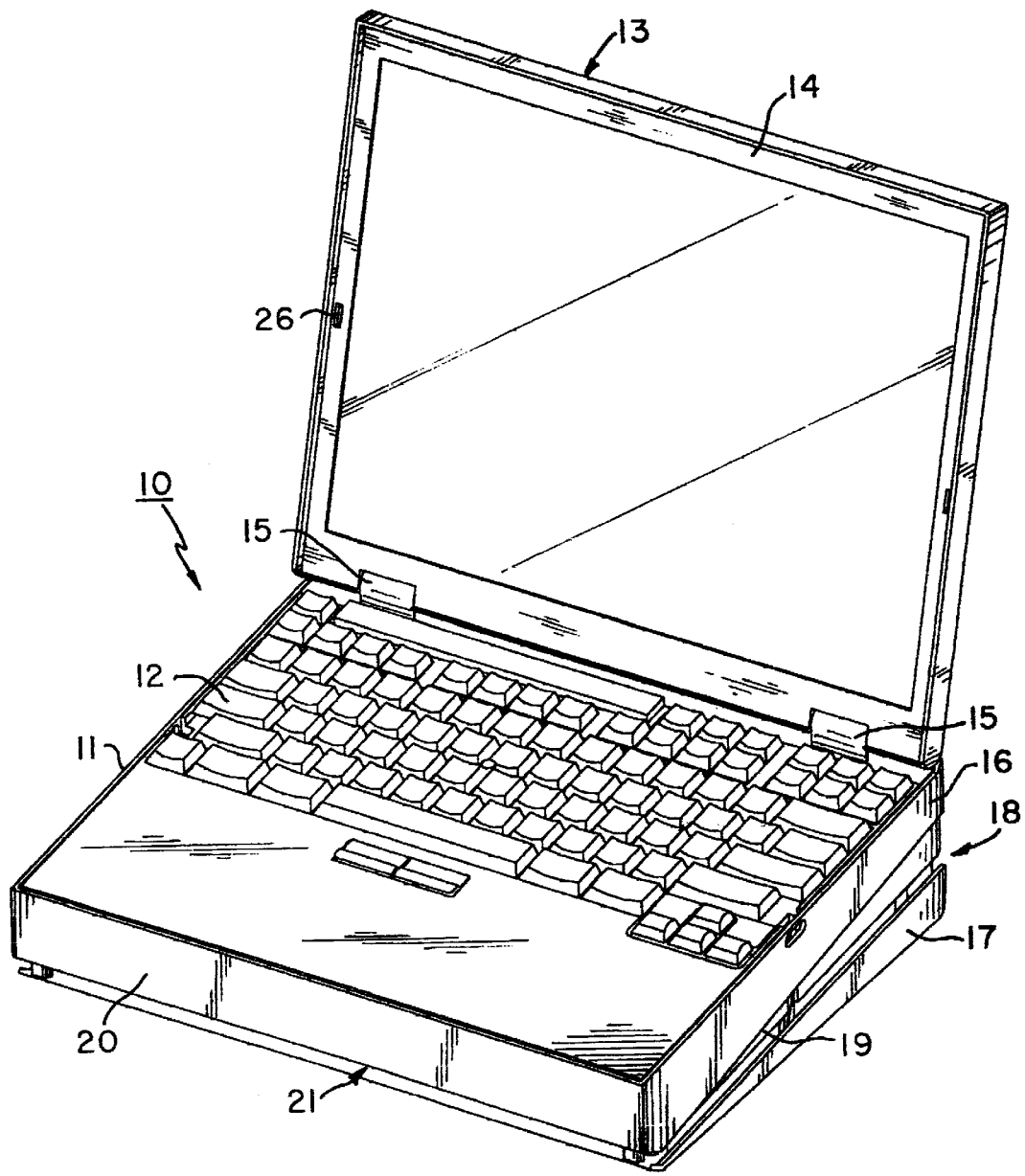
FIG. 1 is an overall isometric view of a portable computer illustrating the riser capability of the invention.

In FIG. 1 there is shown an overall isometric view of a portable computer illustrating the riser capability of the invention. Referring to FIG. 1, a portable computer 10 is shown with the cover in an open position. The portable computer 10 is in a standard package in the art with a base portion 11 supporting a keyboard 12 with heat generating components, not visible, being enclosed in the base 11. A cover 13 containing a display 14 is attached to the base 11 by hinges 15.

In accordance with the invention, a riser capability is provided that moves the portion 16 of the computer, that is the rear side away from the user, upward, when the portable computer 10 is deployed in position for use. The riser capability involves a support portion 17 on which the portable computer 10 is to rest when in use and a means 18 for moving the rear portion 16 upward thereby providing a tilt to the base 11, the keyboard 12 and the lower surface 19 of the base 11. The support portion 17 also positions the front 20 of the base 11 next to the user with an air flow accommodating gap 21 between the lower surface 19 of the base 11 and the surface on which the support portion 17 rests. There is a corresponding exit gap at the rear between the portion 16 of the base 11 and the support 17. In operation, heat from the enclosed components is transferred into and through the entire area of the lower surface 19 of the base 11 where the air coming in the gap 21 flows and rises along the tilt providing thereby a convective component to the heat transfer flow. The invention provides a substantial increase in the overall passive heat dissipation out of the base 11, greater relaxation of maximum temperature constraints on individual components and an improved angle for the operator in using the keyboard.

It will be apparent that there will be considerable flexibility in implementation of the means employed in the riser capability 18. In selecting an implementation, it is desirable to have all aspects of portable computer operation be unitary with the package and to deploy and be ready for use in connection with a single operation of opening the cover. The deployment can be achieved using built in sources of force or through forces translated from the motion of the positioning of the cover.

Figure 2:
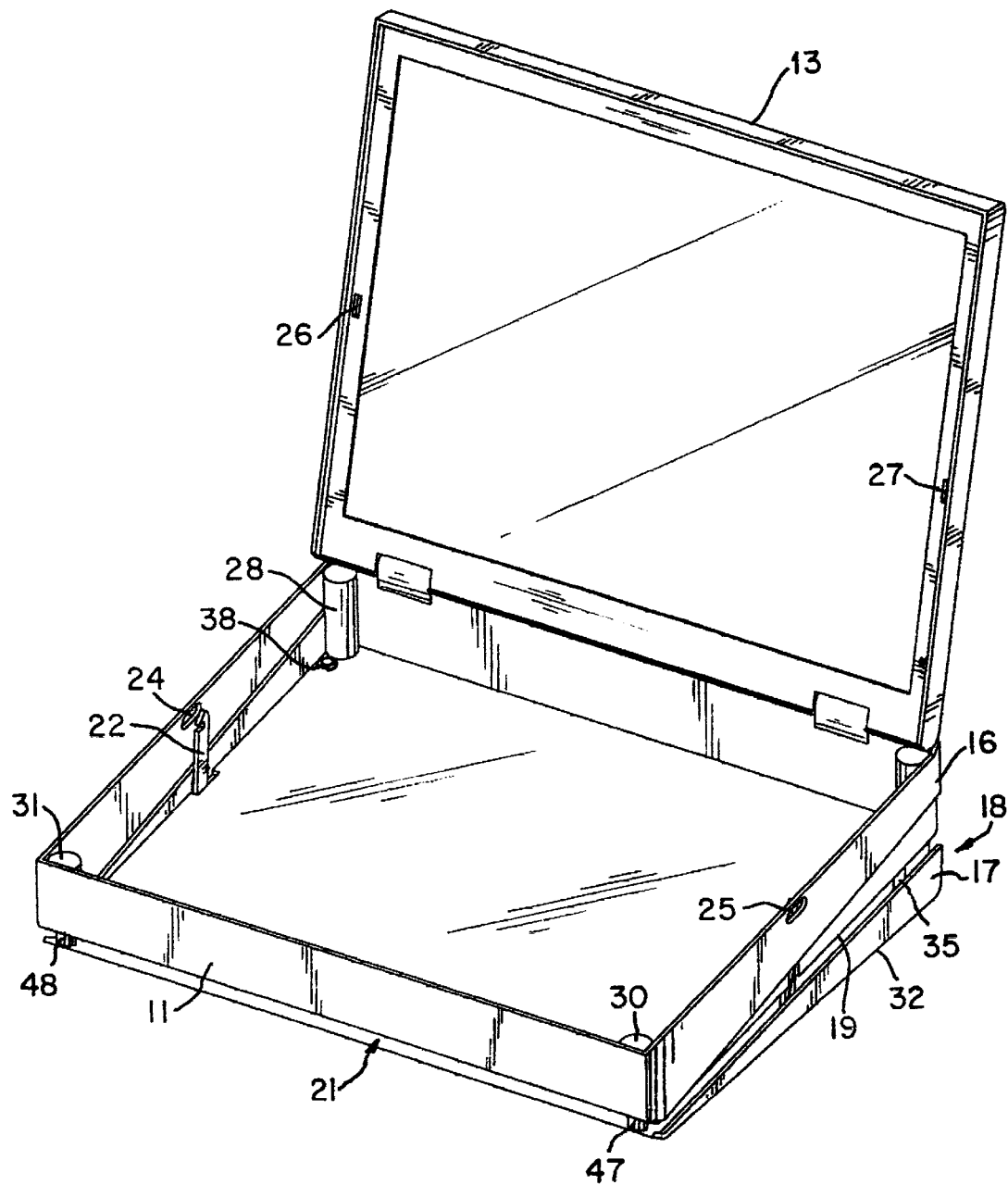

In connection with FIGS. 2 to 7 an embodiment of the invention is provided wherein, in a single operation of releasing and opening the cover, the riser capability is placed into service and where latches are provided that automatically deploy the riser mechanism Referring to Fig.2 the portable computer package is shown with the keyboard 12 and the heat generating components removed from the base 11. The riser capability 18 is automatically deployed when the user trips latches 22 and 23 through openings 24 and 25. Latches 22 and 23 also operates to latch the cover 13 in the closed position by engagement with the cover 13 in openings 26 and 27. The latches 22 and 23, when unlatched, allow cover 13 to be opened as is commonly done. Because latches 22 and 23 serve a dual purpose, the riser capability is automatically actuated when the user unlatches and opens the computer 10 without additional user intervention. Since an advantage of the invention is to permit the computer to be operated with a higher operating temperature because of the increased passive heat dissipation provided by the invention it is better that the riser capability automatically deploy each time the computer is used, to avoid any possibility of overheating of internal components of the computer.

Inside the base 11 are built in spring cavities 28,29,30 and 31 which house springs not visible in this figure, that as part of the riser capability, operate to force elements 16 and 17 apart at the rear and to force parts 16 and 17 apart at the front to establish the gap 21. The spring cavities 28–31 can be molded into base 11 at the time of molding if the base is made of a plastic such as the ABS type available in the art or, if base 11 is to be made of metal they can be formed into the base 11 at the time of manufacture.

Accordingly, aspects of the invention as shown in FIG. 2 provide an automatically deploying and manually retracting riser capability assembly for a portable computer. The automatic deploying and manually retracting assembly includes a vertically movable bottom 32 of the support 17 in addition to the surface 19 that ordinarily exists on portable computers as the bottom of the base 11. At least one latch and spring deploying mechanism is interconnected with the movable support 17 as well as to the hinged cover 13 for the automatically deployment when the latches are operated when the user opens the display.

When the user closes the cover 13, the cover 13 is latched by manually bringing the movable support 17 towards the stationary bottom surface 19 of the base 11 either by pushing down on the portable computer if the surface 32 is resting on a horizontal surface such as a desk or table, or by squeezing the top and bottom of the portable computer together to bring the movable support 17 and the base 11 together to be latched in the closed position.

In operation with the riser capability 18 having positioned elements 16 and 17 apart, air is thus allowed to flow through the gap 21, to flow all over the area of the surface 19, and to flow out the back.

Where it is desirable that there be no contact with the user when the computer is on the user's lap, due to elevated temperatures, contact is prevented by providing the moveable support 17 with a complete bottom surface 32.

Figure 3:
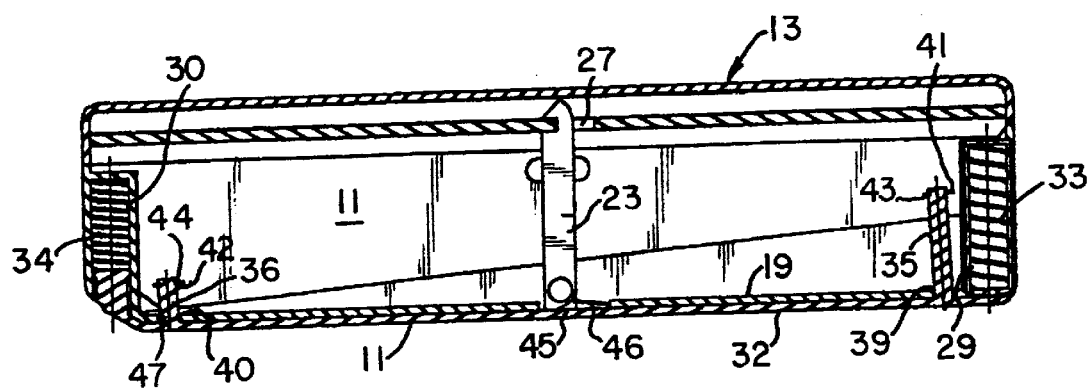
Figure 4:
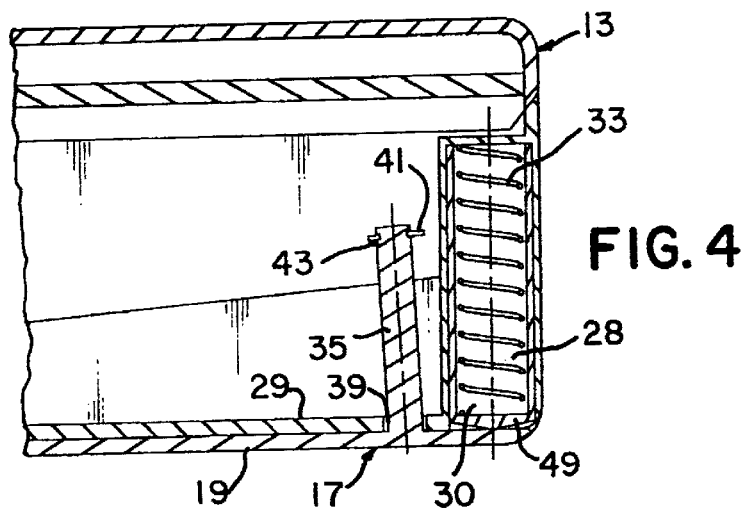

In FIGS. 3 and 4, riser movement force, spring construction and travel limiting members, are illustrated. Referring to FIGS. 3,and 4 together in which in FIG. 3 a cutaway view is provided of a the portable computer as shown in FIG. 2 taken through the center of spring cavities 29 and 30, with the cover 13 in the closed position and with the only visible latch 23 in the latched position, and in FIG. 4 which shows, at a larger scale, the rear portion of FIG. 3. In FIG. 3 the cavities 29 and 30 would have springs 33 and 34 that would urge the base 11 in the upward direction with all four springs in the cavities 28–31 providing the force for deployment of the riser capability 18. Latch 23 keeps the cover 13 latched in the closed position by attachment to the cover 13 in hole 27. The springs 33 and 34 in the cavities 29 and 30 exert an upward urging force between a portion of the support 17 and the base 11.

To limit the travel of the upward motion of the base 11,stop members 35 and 36 that are of a group of four of which only stop members 35 and 36 are visible, protrude through holes 39 and 40 respectively in the bottom surface 19 of the base 11 and have attached to the ends thereof clips 41 and 42 in groves 43 and 44. These clips, known as "E-ring" clips are common in the art. A manufacturer of such clips, for example, is Seeger, Inc., Somerset, N.J. Several other clip styles besides E-ring clips may be used. There is corresponding structure out of view in this figure for stop members adjacent the cavities 28 and 31 shown in FIG. 2 on the opposite side of the base 11.

When latches 22 and 23 are unlatched, the springs in cavities 28 to 31 of Fig.2 raise the base 11 upward. The upward motion is stopped when the clips on the stop members come to rest on the bottom surface of the base 11, as shown more clearly in FIG. 5 which is another cutaway view taken through the same plane as in FIG. 3 but shows the riser capability fully deployed but with the cover 13 still in the closed position. The latch 23 extends through a slot 45 in the bottom of base 11, there is a corresponding slot out of view for latch 22.

Figure 6:
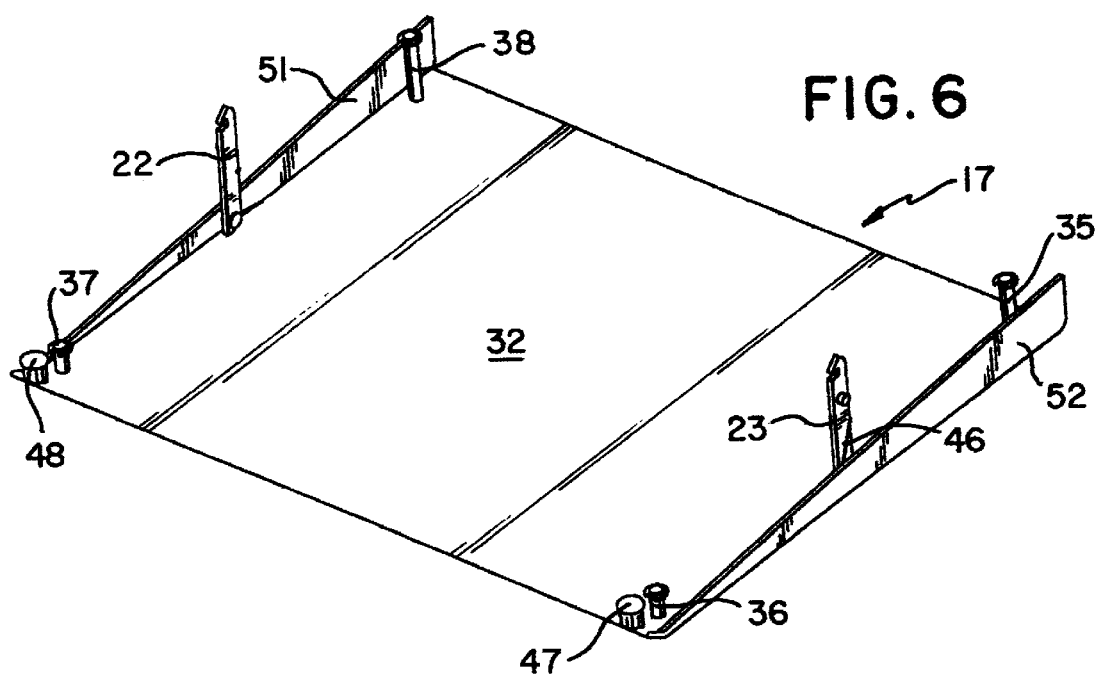

Referring again to FIG. 3 the front spring in cavity 30 and it's counterpart on the other side of base 11 in cavity 31 pushes upwardly base 11 from support 17 while resting on rest button 47. Likewise on the opposite side shown in FIG. 2 is rest button 48. Both are shown in FIGS. 2 and 6. Rest buttons 47 and 48 are always captured in front spring cavities 30 and 31 respectively and have a fairly close clearance. The close fitting of these parts limits the lateral motion of the base 11 with respect to the support 17 of the riser capability.

When the user releases latches 22 and 23 all the energy stored in the springs in cavities 28 to 31 would be released at once, if not otherwise provided for. To smooth out the motion and release the stored spring energy more slowly, a piston 49 shown in FIG. 4 is provided in spring cavity 29. As the spring 33 in cavity 29 pushes spring cavity 29 upwardly, the air that is trapped between cavity 29 and piston 49 can only escape through the close clearance between them This provides a dash pot type structure for dampening the motion of the spring 33 in cavity 29 and the rising to take place more slowly. A similar piston 50 (not shown) is incorporated in rear spring cavity 28 Since dash pots are widely used in the art, it is well known that other methods of controlling the rate at which the trapped air escapes can be used, for example, a seal between the piston and the cavity such that no air escapes between them and then providing a small hole or even a needle valve to control escaping air can be used.

Figure 5:
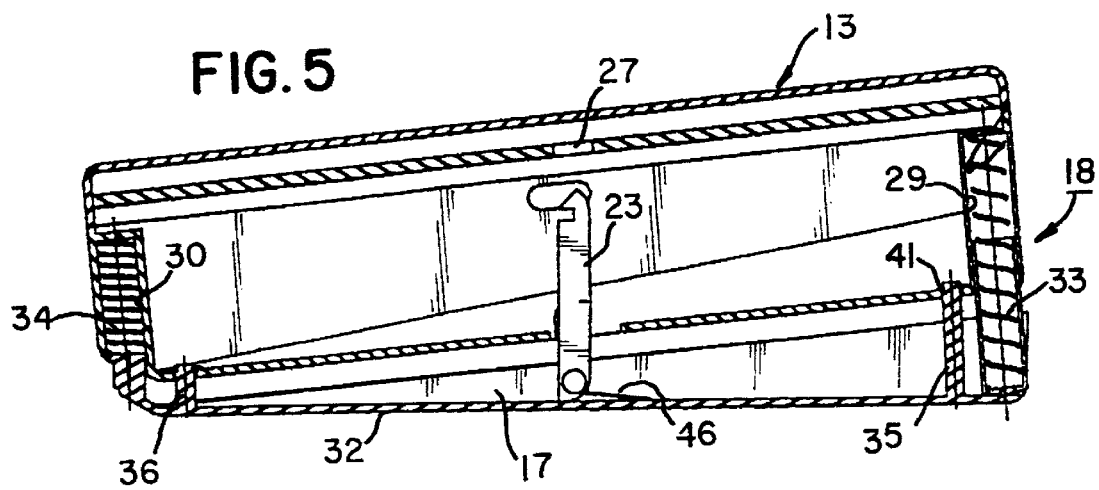

In FIG. 5 the portable computer 10 with the riser capability 18 deployed but with the cover 13 still closed. The stops 35 and 36 have their clips 41 and 42 resting on the bottom 20 of the base portion 11.

Referring to FIG. 6 an independent view is provided of the support portion 17 showing the resting surface 32, the rest buttons 47 and 48, the rear stop 35 and it's counterpart 38, the front stop 36 and it's counterpart 37, and the latches 22 and 23. When assembled the base 11 fits within the tapered side members 51 and 52 of the support 17, which also prevent the user from touching the warmer bottom surface of base 11. For aesthetic purposes the sides 51 and 52 may nest into indentations in the base 11. The nesting is also illustrated in the perspective of FIG. 2. For resting on a table, the lower surface 32 need not be continuous.

Figure 7:
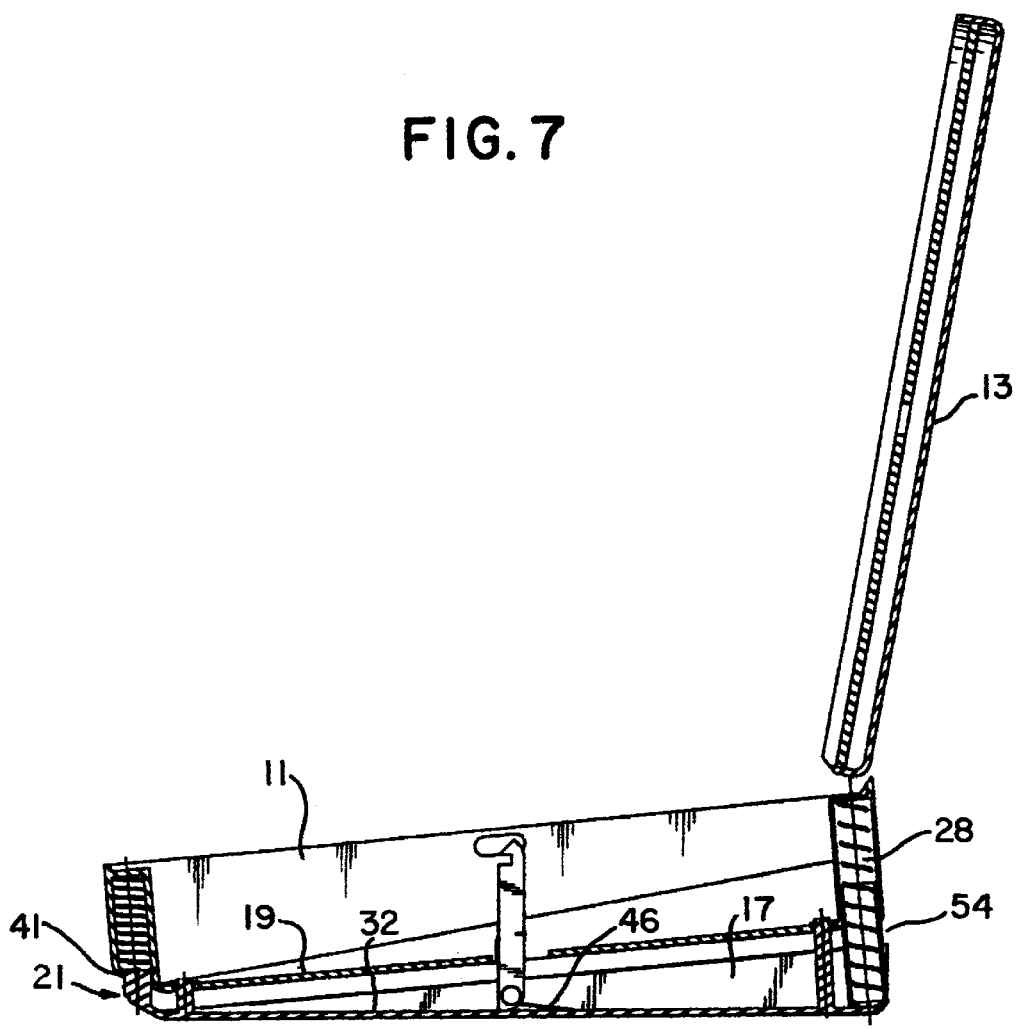

Since the front stops, 36 and its counterpart 37, are shorter than rear stops, 35 and it's counterpart 38, the base 11 is lifted higher at the rear than at the gap 21 at the front, as shown in FIG. 7 thus providing increased cooling capacity by exposing the bottom surface 19 of base 11 to ambient air and a tilted keyboard to the user. At this point the user can lift cover 13 as shown in FIG. 7. When computer 10 is in use, ambient air in the area between bottom surface 19 of base 11 and the surface 32 on which the support 17 rests, is heated by the warm bottom surface 19 of base 11. The heated air rises and makes its way towards the rear of computer 10 and out the opening labelled element 54 between spring cavities 28 and 29 only one 28 being visible in FIG. 7. The warm air escaping out opening 54 is replaced by cooler ambient air entering through the opening 21.

To close the computer, the user would pull cover 13 down as with an ordinary computer and then press down on the computer compressing the springs in cavities 28–31. Latches 22 and 23 would automatically latch due to torsion spring 46 for latch 23 shown in FIG. 7 and it's counterpart for latch 22. Alternatively, the user could squeeze the cover 13 and base 11 of the portable computer together.

What has been described is a riser capability involving a support member which when deployed on a portable computer moves the portable computer base above the support member and provides a slanted bottom surface that dissipates heat more efficiently and provides an improved keyboard angle.

What is claimed is:

1. In a portable computer that is packaged in a case having an essentially rectangular base portion supporting a keyboard that is positioned along a first side and a hinged cover containing a display that is positioned along a second and opposite side of said essentially rectangular base portion, the improvement comprising:

a support member positioned between said base portion and a supporting surface, and, a separating force urging said base portion and said support member apart, said separating force comprising a spring positioned in each interior corner of said base portion, the members of said springs positioned in the interior corners of said second side of said base portion having extension stops that permit said second side of said base portion to to be urged into a position farther from said base portion than at said first side of said base portion, whereby there is, a first air flow separation between said support member and said base portion at said first side of said base portion, and, a second air flow separation that is larger than said first air flow separation at said second side of said base portion.

2. The improvement of claim 1 wherein said separating force includes a latch means operable to hold said cover in the closed position with respect to said base portion with said springs under compression.

3. The improvement of claim 2 wherein said latch means is released through at least one opening in said base portion.

4. A heat dissipation mechanism for a portable computer of a type having an essential rectangular base portion with a bottom surface, supporting a keyboard positioned along a first side of said base portion and with a hinged cover including a display positioned along a second and opposite side of said base portion, comprising:

a riser capability for positioning said bottom surface of said base portion for air flow heat dissipation when said portable computer is in use, said riser capability including, a spring positioned in each interior corner of said base portion, members of said springs positioned in the interior corners of said base portion having extension stops that permit said second side of said base portion to to be urged into a position farther from said bottom surface of said base portion than at said first side of said base portion, whereby there is a first air gap at said first side of said base portion and a second and larger air gap at said second side of said base portion.

5. The improvement of claims 4 wherein said riser means includes a latch means operable to hold said springs of said riser capability in said base portion in compressed condition when said cover is in the closed position.

6. The improvement of claim 5 wherein said latch means is at least one spring loaded member with a notch that engages the edge of a hole in said cover when said cover is in the closed position.

7. The improvement of claim 6 wherein said latch means is released through an opening through said base portion adjacent each latch member.

8. The improvement of claim 7 wherein there is included in said riser capability, for each separate spring positioned in each interior corner of said second side of said base portion, there is provided a cylinder in which said spring is positioned wit an exhaust air dash pot type capability.

9. The method of increasing the passive heat dissipation of a portable computer that is packaged in a case having an essentially rectangular base portion supporting a keyboard that is positioned along a first side and a hinged cover containing a display that is positioned along a second and opposite side of said essentially rectangular base portion, comprising the steps of:

positioning a support member between said base portion and a supporting surface, and, providing a separating force urging said base portion and said support member apart, said separating force comprising springs positioned in each interior corner of said base portion.

10. The method of claim 9 wherein said separating force urging said base portion and said support member apart includes the members of said springs positioned in the interior corners of said second side of said base portion having extension stops that permit said second side of said base portion to to be urged into a position farther from said base portion than at said first side of said base portion, whereby there is, a first air flow separation between said support member and said base portion at said first side of said base portion, and, a second air flow separation that is larger than said first air flow separation at said second side of said base portion.

* * * * *